(12) United States Patent
Fiedler

(10) Patent No.: US 11,381,548 B2
(45) Date of Patent: *Jul. 5, 2022

(54) METHODS OF BIDIRECTIONAL PACKET EXCHANGE OVER NODAL PATHWAYS

(71) Applicant: Network Next Inc., Santa Monica, CA (US)

(72) Inventor: Glenn Alexander Fiedler, Santa Monica, CA (US)

(73) Assignee: NETWORK NEXT, INC., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/135,455

(22) Filed: Dec. 28, 2020

(65) Prior Publication Data

US 2021/0194863 A1 Jun. 24, 2021

Related U.S. Application Data

(63) Continuation of application No. 15/974,305, filed on May 8, 2018, now Pat. No. 10,880,280, which is a
(Continued)

(51) Int. Cl.
*H04L 29/06* (2006.01)
*H04L 9/40* (2022.01)
(Continued)

(52) U.S. Cl.
CPC ........ *H04L 63/0485* (2013.01); *G06F 16/955* (2019.01); *H04L 9/14* (2013.01);
(Continued)

(58) Field of Classification Search
None
See application file for complete search history.

(56) References Cited

U.S. PATENT DOCUMENTS 7,398,398 B2 7/2008 Ofek et al.
8,452,956 B1 * 5/2013 Kersey ............... H04L 63/0281
713/153
(Continued)

FOREIGN PATENT DOCUMENTS

WO 2007035655 A3 11/2007

OTHER PUBLICATIONS

Extended European Search Report dated Nov. 6, 2020 for Application No. 18797606.3.
(Continued)

*Primary Examiner* — Maung T Lwin
(74) *Attorney, Agent, or Firm* — JDI Patent; Joshua Isenberg; Robert Pullman

(57) ABSTRACT

A node system implements a method for node relay communication. A description of a flow entry including an address in a flow and a private key is received. The flow entry and the private key are stored in a database indexed to a flow ID. A packet comprising an authentication code and packet data including packet sequence information and a Flow ID is received. A look up in the database of a flow entry corresponding to the Flow ID of the packet is performed. The packet is either ignored or forwarded to the address in the flow, depending on the result of the look-up.

36 Claims, 15 Drawing Sheets

Related U.S. Application Data continuation-in-part of application No. 15/656,454, filed on Jul. 21, 2017, now Pat. No. 9,979,550.

(60) Provisional application No. 62/524,705, filed on Jun. 26, 2017, provisional application No. 62/503,808, filed on May 9, 2017, provisional application No. 62/462,224, filed on Feb. 22, 2017.

(51) Int. Cl.

| | | |
|---|---|---|
| *G06F 16/955* | (2019.01) | |
| *H04L 9/14* | (2006.01) | |
| *H04L 9/30* | (2006.01) | |
| *H04L 9/32* | (2006.01) | |
| *H04L 43/106* | (2022.01) | |
| *H04L 45/745* | (2022.01) | |
| *H04L 61/5007* | (2022.01) | |
| *H04L 67/141* | (2022.01) | |
| *H04L 67/146* | (2022.01) | |
| *H04L 43/0864* | (2022.01) | |
| *H04L 61/2514* | (2022.01) | |

(52) U.S. Cl.
CPC .............. *H04L 9/30* (2013.01); *H04L 9/3213* (2013.01); *H04L 9/3247* (2013.01); *H04L 9/3297* (2013.01); *H04L 43/106* (2013.01); *H04L 45/745* (2013.01); *H04L 61/2007* (2013.01); *H04L 63/045* (2013.01); *H04L 63/126* (2013.01); *H04L 67/141* (2013.01); *H04L 67/146* (2013.01); *H04L 43/0864* (2013.01); *H04L 61/2514* (2013.01); *H04L 2463/121* (2013.01)

(56) References Cited

U.S. PATENT DOCUMENTS

| | | |
|---|---|---|
| 9,433,862 B2 | 9/2016 | Bruno, Jr. et al. |
| 9,979,550 B1 | 5/2018 | Fiedler |
| 10,797,884 B2 | 10/2020 | Fiedler |
| 2002/0010684 A1* | 1/2002 | Moskowitz .......... G06Q 20/382 713/176 |
| 2003/0083903 A1* | 5/2003 | Myers .................... G16H 15/00 705/2 |
| 2005/0220095 A1* | 10/2005 | Narayanan ............ H04L 63/126 370/389 |
| 2006/0268718 A1 | 11/2006 | Jones |
| 2010/0313034 A1* | 12/2010 | Senshu ............ G11B 20/00362 713/193 |
| 2011/0035585 A1* | 2/2011 | Haddad ................. H04L 63/061 713/168 |
| 2011/0060910 A1* | 3/2011 | Gormish ............... H04L 9/3247 713/176 |
| 2011/0171953 A1* | 7/2011 | Faccin .................. H04W 48/08 455/426.1 |
| 2011/0185039 A1 | 7/2011 | Ueno et al. |
| 2012/0270644 A1 | 10/2012 | Buhr |
| 2015/0326542 A1 | 11/2015 | Serebrin |
| 2016/0127133 A1 | 5/2016 | Pinder et al. |
| 2016/0248686 A1 | 8/2016 | Lee et al. |
| 2016/0344729 A1* | 11/2016 | Slaight ................. H04L 63/061 |
| 2018/0054410 A1 | 2/2018 | Bhagwan et al. |
| 2020/0389320 A1 | 12/2020 | Fiedler |

OTHER PUBLICATIONS

International Search Report dated Sep. 20, 2018 for International Patent Application No. PCT/US2018/031641.

Non-Final Office Action for U.S. Appl. No. 15/974,305, dated Mar. 6, 2020.

Notice of Allowance dated Aug. 20, 2020 for U.S. Appl. No. 15/974,305.

S. Hong, H. Schultzrinne, Hughes Network Systems, Columbia U., "PBS NSLP: Network Traffic Authorization", Network Trafficking Group, Internet Draft, Internet Engineering Task Force, IETF, Internet Society (ISOC), Oct. 14, 2013, Geneva, Switzerland.

\* cited by examiner

Route to Server

Flow tokens

Flow token

| Key | Value |
|---|---|
| {Flow ID, Flow Version} | Entry |
| - | - |
| - | - |
| - | - |

Figure 8A

| Entry Data ||||
|---|---|---|---|
| Token Data || Runtime Data ||
| Expiration timestamp || Timestamp of last packet received (previous) ||
| Previous Node IP address + port | Next Node IP address + port | Timestamp of last packet received (next) ||
| Flow private key || Previous node replay protection ||
| || Next node replay protection ||

Figure 8B

METHODS OF BIDIRECTIONAL PACKET EXCHANGE OVER NODAL PATHWAYS

This application is a continuation of U.S. patent application Ser. No. 15/974,305 filed May 8, 2018. U.S. patent application Ser. No. 15/974,305 claims the priority benefit of U.S. Provisional Patent Application No. 62/503,808 filed May 9, 2017, the entire contents of which are incorporated by reference in their entirety.

U.S. patent application Ser. No. 15/974,305 also claims the priority benefit of U.S. Provisional Patent Application No. 62/524,705 filed Jun. 26, 2017, the entire contents of which are incorporated herein by reference.

U.S. patent application Ser. No. 15/974,305 is a continuation-in-part of U.S. patent application Ser. No. 15/656,454 to Glenn Alexander Fiedler, filed Jul. 21, 2017, the entire contents of which are incorporated herein by reference. U.S. patent application Ser. No. 15/656,454 claims the priority benefit of U.S. Provisional Patent Application No. 62/462,224 filed Feb. 22, 2017, the entire contents of which are incorporated herein by reference.

FIELD OF THE DISCLOSURE

The field of the disclosure is network communications.

BACKGROUND

The background description includes information that may be useful in understanding the present invention. It is not an admission that any of the information provided in this application is prior art or relevant to the presently claimed invention, or that any publication specifically or implicitly referenced is prior art.

Real-time multiplayer gaming in general operates by sending unreliable-unordered packets over the Internet, for example, as User Datagram Protocol (UDP), in a bidirectional flow pattern where packets sent in both directions, from client to server and server to client, at some rate like 10, 20, 30, or 60 packets per-second.

Packets exchanged between the client and server are extremely sensitive to latency, jitter, and/or packet loss. Collectively known as quality of service or "QoS."

In general, clients connect to dedicate servers by sending and receiving packets directly to the server's Internet Protocol (IP) address, but this leaves dedicated servers vulnerable to DDoS attack because the server's IP address is exposed.

Also, when packets are sent over the public internet, the route that packets take between the client and server is not under the direct control of the client or server. Packets make take a route that is cheapest, rather than a route that optimizes QoS.

Similarly, while packets are exchanged over the internet, if the route that packets take between a client and server degrades, or a better route becomes available, the client or server have no way to adjust the route that packets take between the client and the server.

Thus, there exists a need for improved methods of connecting clients with dedicated servers that does not expose the IP address of the server and provides some degree of control over the route taken by packets between the client and server.

BRIEF DESCRIPTION OF THE DRAWING

FIG. 8A illustrates a relay's cache.

FIG. 8B illustrates the entry data in a relay's cache.

DETAILED DESCRIPTION

Figure 1:
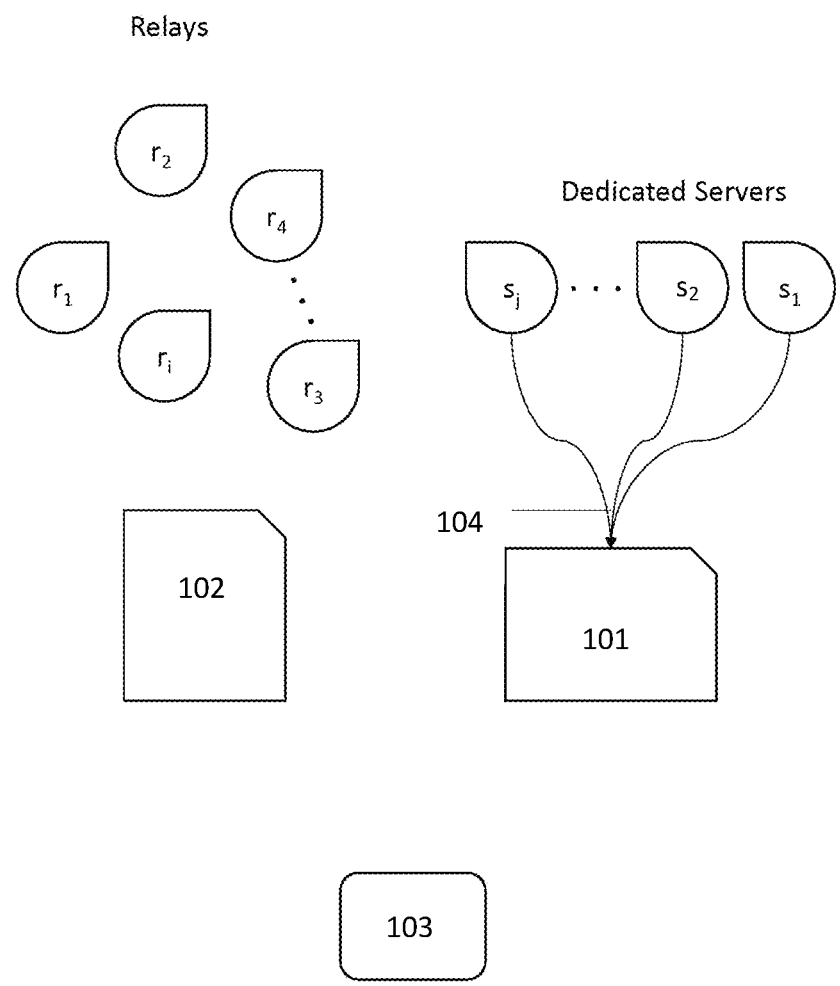
FIG. 1 illustrates dedicated servers reporting information to the matchmaker.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, Random Access Memory (RAM), flash, Read Only Memory(ROM). The software instructions preferably configure the computing device to provide the roles, responsibilities, or other functionality as discussed below with respect to the disclosed apparatus. In especially preferred embodiments, the various servers, systems, databases or interfaces exchange data using standardized protocols or algorithms, possibly based on Hyper Text Transfer Protocol (HTTP), Hyper Text Transfer Protocol Secure (HTTPS), Advanced Encryption Standard (AES), public-private key exchanges, web service Application Programming Interfaces (APIs), known financial transaction protocols, or other electronic information exchanging methods. Data exchanges preferably are conducted over a packet-switched network, the Internet, Local Area Network(LAN), Wide Area Network(WAN), Virtual Private Network(VPN), or other type of packet switched network. The following description includes information that may be useful in understanding the present invention. It is not an admission that any of the information provided in this application is prior art or relevant to the presently claimed invention, or that any publication specifically or implicitly referenced is prior art.

The inventive subject matter encompasses systems and methods of connecting two computers via a flow route such that neither of the two computers has any way of knowing the IP address of the other. It is contemplated that the inventive subject matter can be implemented in the area of online gaming as a protective measure to ensure that no client (e.g., a gamer) can know the IP address of the dedicated server (e.g., the game hosted server).

To ensure clients cannot know the identity or location (e.g., IP address and port) of a server, at least one relay can be implemented as a go-between to facilitate packet exchange. By having a relay positioned in between the client and the server, the client only ever needs to know that it must send packets to the relay, and the relay in turn knows that it receives packets from the client and sends packets to the server. The server, in the same manner, only knows that it receives packets from the relay and in turn sends packets to the relay.

It can be advantageous to include additional relays. In systems that include more than one relay, relays, the client, and the server can all be called "nodes." The ultimate goal is to enable packet exchange between a client and a server via a flow route in such a way that the client never knows the IP address and port of the server while also optimizing the route according to some metric.

More specifically, embodiments of the inventive subject matter provide optimized routes between clients and dedicated servers, by pinning the route to "relays" in between over the public internet. Routes can be optimized to, for example, reduce latency, reduce packet loss, or improve any other QoS (quality of service) metric as desired. As long as multiple relay routes between client and server exist and each relay route has different characteristics, the best route can be selected. This is analogous to route finding software such as Google maps, Apple maps, Waze, etc. in that the desired end result is to select and establish the fastest route to a destination.

Embodiments of the inventive subject matter also provide Distributed Denial of Service (DDoS) protection by hiding the IP address of a dedicated server from the clients that are in communication with it. This makes it impossible to attack the dedicated server in a traditional DDoS attack. Embodiments also provide the ability to dynamically change routes while a client continues to exchange packets with a dedicated server. For example, if a better route becomes available, or if the current route has a relay along the way that is under DDoS attack, then by dynamically changing the route without ceasing packet exchange between the client and the server over the existing route, a client's session (e.g., gaming session) can continue uninterrupted on a dedicated server, even though it has dynamically adjusted its route.

Embodiments of the inventive subject matter also improve security. Malicious 3rd parties are unable to hijack relays of the inventive subject matter to send packets across them. The inventive subject matter makes it trivial for a system to reject packets that do not originate from a valid client or server.

Figure 2:
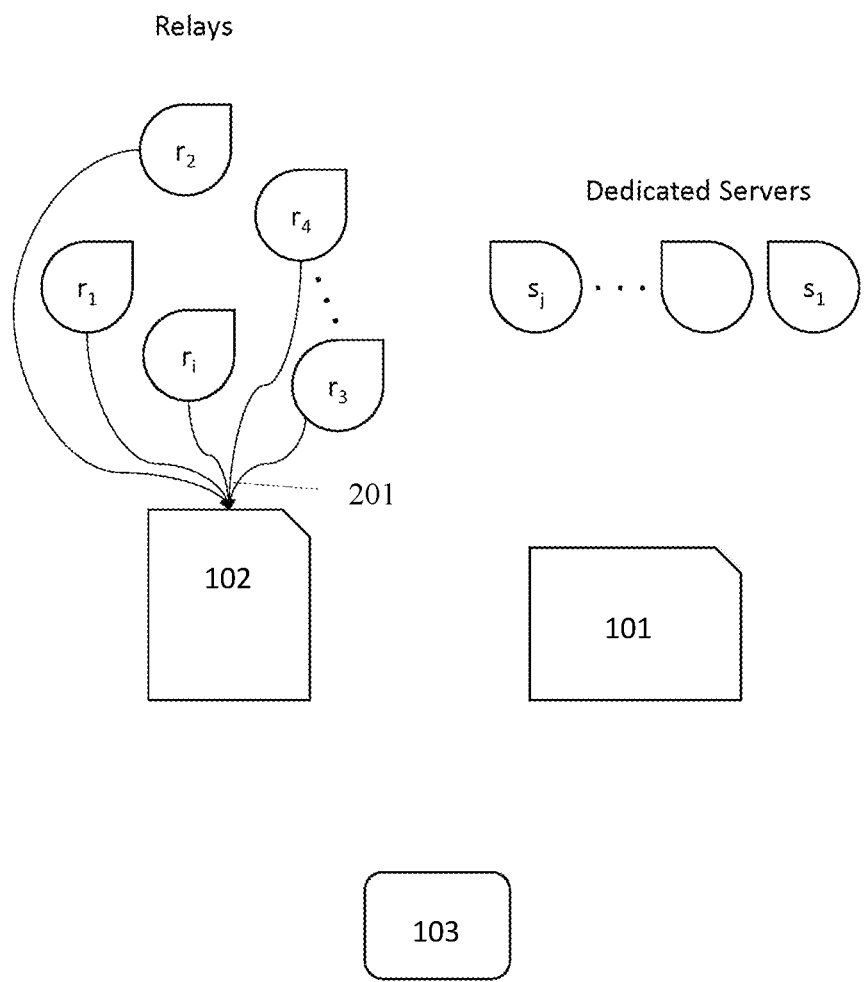
FIG. 2 illustrates relays reporting information to the master server.

FIGS. 1 and 2 show several background polling operations. Periodically (e.g., at regular or irregular intervals), the dedicated servers $\{s_1, \ldots, s_j\}$ (e.g., a dedicated game server that is headless version of the game running in a data center such as a private cloud (e.g., a data center, or "bare metal"), or a public cloud such as Google Compute, Amazon EC2, or Microsoft Azure) report their IP addresses, ports, and public keys to the matchmaker. FIG. 1 shows the dedicated servers $s_1 s_2 \ldots s_j$ reporting 104 their IP addresses and ports along with their public keys back to the matchmaker 101. Reporting occurs periodically (e.g., at regular or irregular intervals). For example, each dedicated server $s_1 s_2 \ldots s_j$ can report 104 its IP address and port to the matchmaker 101 once every 1-5 minutes. It is also contemplated that dedicated servers $s_1 s_2 \ldots s_j$ can report to the matchmaker 101 at other intervals including every 1-30 seconds, 30-59 seconds, or even multiple times per second (e.g., 2-10 Hz). Periodic reporting 104 enables an optimized microservices architecture based around a queue to handle a large number of dedicated servers.

The matchmaker 101 maintains this list, and updates it as necessary (e.g., if a dedicated server $s_1 s_2 \ldots s_j$ ceases to report, the matchmaker 101 takes that dedicated server out of its maintained list, or if a new dedicated server reports with a new IP address and port, the matchmaker adds that information to its database). Data per-dedicated server contains at minimum, the IP address, port, and public key for each dedicated server, but may also include other criteria useful to determine which dedicated servers best satisfy a client's request (e.g., game version number, number of players currently connected to the server, total players allowed to connect to the server, region the server is located in, game mode the server is currently running, for example "CTF" or "Deathmatch," the skill level of players currently connected to the server, etc.).

The matchmaker 101 can be operated by, for example, a video game company. The matchmaker 101 has some authentication that allows it to communicate with the master server 102, which is otherwise not publicly accessible. The role of the matchmaker 101 is to take a client's 103 request to play the game, and find the set of dedicated server IP addresses and ports for the client to connect to that satisfy that client's request. This could be for example, servers running the same game mode the client requested or servers in the same region as the client 103, with a the same game version number and a set of players of similar skill to the client player, or any other criteria.

For purposes of this application, a "flow route" is a nodal pathway linking a client to a server. A "flow" describes the packets that are exchanged over a "flow route" once it is established.

FIG. 2 shows the relays $r_1, r_2 \ldots r_i$ reporting their IP addresses and ports along with their public keys to the master server. The master server performs 102 the same functions as the matchmaker 101 in this capacity: it stores the IP addresses and ports along with the public keys for the relays $r_1, r_2 \ldots r_i$, and it updates this information as needed. As with the matchmaker 101, reporting 201 occurs periodically (e.g., at regular or irregular intervals). For example, each relay $r_1, r_2 \ldots r_i$ can report 201 its IP address and port to the master server once every 1-5 minutes. It is also contemplated that relays can report 201 to the master server 102 at other intervals including every 1-30 seconds, 30-59 seconds, or even multiple times per second (e.g., 2-10 Hz). Periodic reporting 201 enables an optimized microservices architecture based around a queue to handle a large number of relays.

It is additionally contemplated that relays $r_1, r_2 \ldots r_i$ can authenticate with a master server 102 to ensure unauthorized relays are not able to register themselves with the master server 102.

At minimum, data per-relay includes the IP address+port and public key of that relay, but may also contain additional information that can be used in the creation of flow routes that are optimized based on different criteria (e.g., longitude/latitude of each relay, nearby relays, current measured round trip times to nearby relays, etc.).

The master server's 102 role is to generate flow routes between two endpoints (e.g., a pathway from a client to a dedicated server via a series of relays). Nodal pathways can be identified algorithmically in an effort to identify a flow route that is optimized based on one or more factors (e.g., to minimize latency, minimize packet loss, minimize jitter, or any combination thereof). The master server 102 is available for the matchmaker 101 to query using, for example, a REST API.

Before discussing the process of establishing a flow, it is important to introduce the different packet types that embodiments of the inventive subject matter incorporate. Packets sent over the network in embodiments of the inventive subject matter are prefixed with one byte identifying the type of packet. There are four packet types: 0, 1, 2, and 3. Packet type 0 indicates a request packet. Packet type 0 has the form [0][flow token 0, flow token 1, . . . , flow token n−1] and corresponds to the flow route data structure prefixed by a zero byte. Packet type 1 indicates a response packet. Packet type 2 indicates a payload packet that passes from client to server. Packet type 3 indicates a payload packet that passes from server to client. Packet sequence numbers only apply to response packets and payload packets. Packet types 1 has the form: [1][packet sequence][Flow ID][flow version][hmac], while packet types 2 and 3 have the form: [1, 2 or 3][packet sequence][Flow ID][flow version][hmac](payload data).

Client States

To begin, a client can exist in several states:

| | |
|---|---|
| FLOW_CLIENT_STATE_INVALID_FLOW_ROUTE | 2 |
| FLOW_CLIENT_STATE_TIMED_OUT | 1 |
| FLOW_CLIENT_STATE_STOPPED | |
| FLOW_CLIENT_STATE_REQUESTED | |
| FLOW_CLIENT_STATE_ESTABLISHED | |

Clients begin in the "stopped" state (state 0), and when a user needs to establish a flow, the user passes the flow route to the client. The client then attempts to decrypt the first flow token in the flow route with its private key, and the public key of the master server (which it knows). If the flow token fails to decrypt, has expired, or is invalid for any reason, the client goes to invalid flow route state (state −2). Otherwise, the client goes into the "requesting" state (state 1). While in this state, the client sends request packets at some frequency (e.g., 10 Hz) to the first relay. If while in the "requesting" state, the client receives a "response packet" from the first relay, the client transitions to the "established" state (state 2). While in the "established state" the client stops sending "request packets." If the client while in "requesting" or "established" states doesn't receive a packet from the first relay for some amount of time (e.g., 1-10 seconds), it times out and goes to "timed out" state.

If the client is in the "requested" state or the "established" state, a user can send payload packet from the client to the server and potentially receive any payload packets sent from the server to the client. This allows the client to optimistically send payload packets before the flow has been confirmed as fully established. In addition when the client sends payload packets toward the server, for each packet it generates a "flow header with the packet sequence number, the Flow identifier (ID), flow version and Hash-based Message Authentication Code(HMAC) (e.g., signed with a flow private key from the flow token), and then passes that packet to the first relay. Then, the client increases the packet sequence number, which starts at 0 and increases by 1 with each packet. The flow private key is a stand-alone symmetric key used to secure the flow against unauthorized packets. The flow private key may be randomly generate for each flow granted by the master server 102.

When the client receives payload packets from the server, it compares their packet sequence number against the replay protection buffer. Packets are discarded if they have already been received or are too old. This avoids a class of protocol level attacks called "replay" attacks, where valid packets already exchanged across the system are replayed by an attacker in an attempt to break the protocol. Many of these concepts are described more fully below.

Relay Behaviors

Relays across embodiments can have some common behaviors. For example, when packets are received over the network by a relay, if the first byte in the packet is 0, indicating a "request packet," the relay in some embodiments will take several actions: (1) the relay will decrypt the first flow token in the packet (e.g., the token corresponding to that relay in the flow route) using the relay private key and the master server public key; (2) if the flow token fails to decrypt, the relay ignores the packet; (3) the relay tests if the flow token has expired, and ignores the packet if the token is expired; (4) the relay searches for a flow entry corresponding to the Flow ID and Flow version (e.g., the {Flow ID, Flow version} tuple) in the flow token; (5) if the entry already exists, the relay updates the timestamp the last packet was received from the previous node to the current timestamp; (6) if the entry does not already exist in the relay's cache, the relay creates a new entry for this flow, indexed by Flow ID and Flow version (e.g., the {Flow ID, Flow version} tuple) with the timestamp of packets last received from previous and current nodes set to the current timestamp, (6a) if the previous address in the flow token is marked as "none", then the previous address and port in the new flow entry is set to the IP address+port that the request packet was sent from, allowing clients without fixed public IP address and port (e.g., clients behind NAT) to participate in flow routes; (7) in both cases 5 and 6, the relay takes the request packet and removes both the prefix byte (which is 0 for this packet type) and the first flow token; (8) the relay then adds a new prefix byte of 0 in front of the remainder of the request packet, and passes this modified packet to the next node in the flow route (e.g., the next relay, or if the server is next, the server).

The relay private key referred to above may be randomly generated for each relay. Each relay private key has a corresponding public key. The relay private key allows the master server 102 to communicate flow tokens to that relay securely, knowing only the public key of that relay. In some implementations nodes at the ends of each flow, e.g., clients and servers, may also have their own randomly generated private keys. The term "node private key" is sometimes used herein to refer generally to private keys for relays and other types of nodes, such as clients and servers.

If the packet first byte is 1, indicating a "response packet," in some embodiments the relay will take several actions: (1) it looks up the flow entry corresponding to the Flow ID and Flow version (e.g., the {Flow ID, Flow version} tuple) in the packet; (2) if no flow entry exists, the relay ignores the packet; (3) the relay checks that the HMAC of the packet indicates that the packet data (Sequence number, Flow ID, Flow version) was signed with the flow private key (which was sent to the relay in the flow token, in the request packet); (4) if the signature does not match, the relay ignores the packet; (5) the relay tests the packet sequence number against the replay protection buffer for packets received from the next node, and if the packet has already been received, or is old (e.g., the packet is outside of replay protection buffer), the relay ignores the packet; (6) otherwise, the packet is valid, and the relay forwards the packet, without modification, to the previous node (e.g., the previous relay or the client if the relay is the first relay in the flow route); (7) updates the timestamp of the last packet received from the next node in the entry to the current timestamp.

If the packet first byte is 2, indicating a "client to server packet," in some embodiments the relay will take several actions: (1) the relay looks up a flow entry corresponding to the Flow ID and Flow version (e.g., the {Flow ID, Flow version} tuple) in the packet; (2) if no flow entry exists, the relay ignores the packet; (3) the relay checks that the HMAC of the packet indicates that the packet data (Sequence number, Flow ID, Flow version) was signed with the flow private key (which was sent to the relay in the flow token, in the request packet); (4) if the signature does not match, the relay ignores the packet; (5) test the packet sequence number against the replay protection buffer for packets received from previous node, and if the packet has already been received or is old (e.g., outside of replay protection buffer), the relay ignores the packet; (6) otherwise, the packet is valid, and the relay forwards the packet, without modification, to the next node (e.g., the next relay, or the server, if this relay is the last relay before the server); and (7) updates the timestamp of the last packet received from the previous node to the current timestamp.

If the packet first byte is 3, indicating a "server to client packet," in some embodiments the relay will take several actions: (1) the relay looks up a flow entry corresponding to the Flow ID and Flow version (e.g., the {Flow ID, Flow version} tuple) in the packet; (2) if no flow entry exists, the relay ignores the packet; (3) the relay checks that the HMAC of the packet indicates that the packet data (Sequence number, Flow ID, Flow version) was signed with the flow private key (which was sent to the relay in the flow token, in the request packet); (4) if the signature does not match, the relay ignores the packet; (5) the relay tests the packet sequence number against the replay protection buffer for packets from the next node, and if the packet has already been received, or is old (e.g., outside of replay protection buffer), ignores the packet; (6) otherwise, the packet is valid, and the relay forwards the packet, without modification, to the previous node in the flow route (which is the previous relay, or the client, for the first relay node in the flow); and (7) updates the timestamp of the last packet received from the next node to the current timestamp.

If at any time an entry in the relay cache has not received packets from the previous node for some period of time (for example, 5 seconds), or, has not received packets from the next node for some period of time (for example, 5 seconds), that flow entry indexed by the {Flow ID, Flow version} tuple times out, and is removed from the relay cache. At this point the relay ceases to forward packets for the Flow Identified by {Flow ID, Flow version} in either direction.

Server Behaviors

Like relays, servers across embodiments can have common behaviors. Servers listen for packets and creates entries for client sessions. Entries are indexed by Flow ID so the server can "update" a client session when it comes in with a more recent Flow version, (e.g., an updated flow route has been established for a client). This allows for seamless transition from one flow route to another.

If the packet first byte is 0, it is a "request packet." Servers in some embodiments will take the following actions: (1) the server will decrypt the first flow token in the packet using the server private key and the public key of the master server; (2) if the flow token fails to decrypt, the server ignores the packet; (3) if the flow token has expired, the server ignores the packet; (4) otherwise, the server looks up an entry with the Flow ID in the token; (5) if an entry already exists, and the flow version number is the same, the server updates the timestamp that the last packet was received in that entry to the current timestamp; (6) if an entry already exists, but the flow version number is greater in the request packet than the entry value, the server copies across the new flow data (e.g., as if it were a new client session) and updates the timestamp that the last packet was received in that entry to the current timestamp; (7) otherwise, the server adds a new flow entry, indexed by Flow ID, with the timestamp the last packet was received in that entry set to the current timestamp; (8) in all cases above (5, 6, and 7), the server replies with a "response packet" to the previous relay with the packet sequence number for this entry with the high bit set to 1 (e.g., to avoid repetition of the same nonce value between client to server packets and server to client packets); and (9) after the server sends the response packet to the previous node, the packet sequence number for this flow entry is incremented.

If the packet first byte is 2, it is a "client to server packet." Servers in some embodiments will take the following actions: (1) the server looks up the corresponding flow entry for the Flow ID in the packet; (2) if no flow entry exists, the server ignores the packet; (3) the server checks the HMAC in the packet to make sure the signature check passes according to the flow private key corresponding to this flow entry, and if it doesn't, the server ignores the packet; (4) the server delivers the packet payload to the user. This allows the client to send data across the flow route to the server, as if it were directly connected to the server.

A user can send payload packets from the server to the client by specifying the Flow ID that packets should be sent to. When the server sends payload packets to a client, the server looks up the entry in its cache for that Flow ID. The server then generates a "flow header" with the packet sequence number from that flow entry, the Flow ID, Flow version, and HMAC (e.g., signed with a flow private key from the flow token), and passes that packet to the previous relay in the flow route for that flow entry. As with response packets, the server sets the high bit of the packet sequence number to 1, to ensure that packet sequence numbers (nonce) values are unique across client to server and server to client packets for a particular flow. The server then increases the packet sequence number for that flow entry, which starts at 0 and increases by 1 with each packet sent to the client in that flow.

If at any time a flow entry in the server's cache has not received a packet for some amount of time (for example, 5 seconds), that entry indexed by Flow ID times out and is removed from the cache. At this point the server stops being able to receive packets sent from the client corresponding to that Flow ID, and being able to send packets to the client corresponding to that Flow ID.

The following discussion describes how these client, server, and relay behaviors operate in the context of establishing a flow between a server and client. Although some of the descriptions below may include different details, it is contemplated that any of the behaviors described above can be implemented where necessary in the processes or steps described below.

Figure 3:
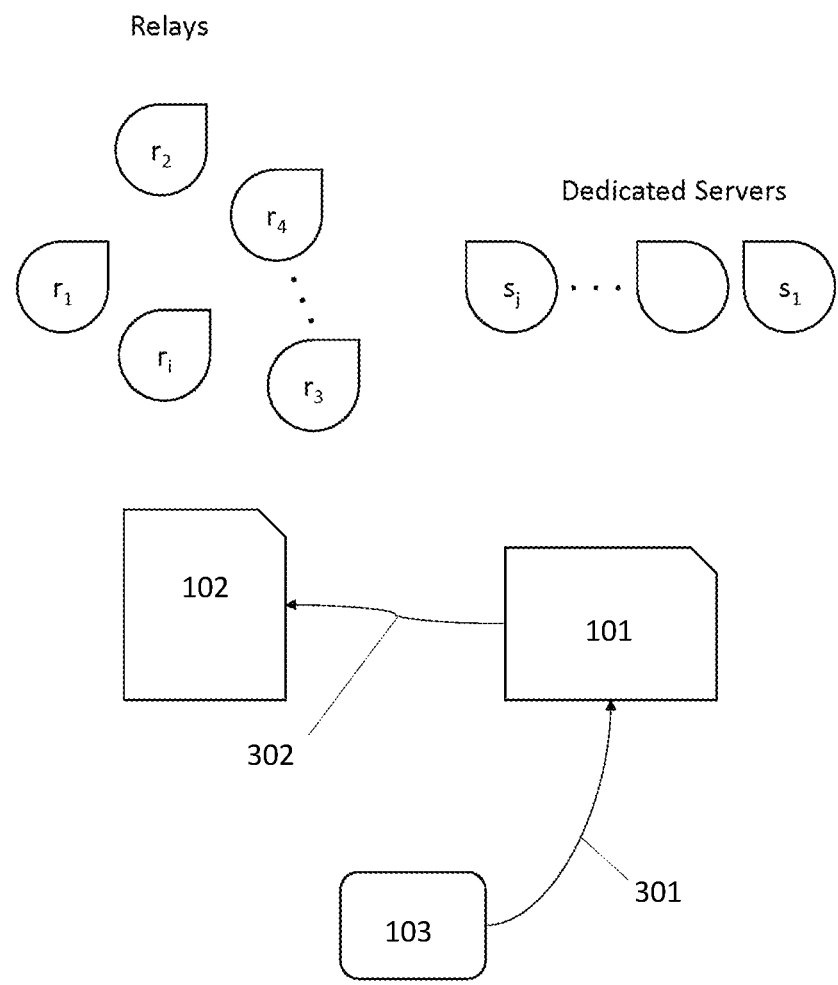
FIG. 3 illustrates a client requesting to connect to a dedicated server.

FIG. 3 shows the first steps in establishing a flow route. In the context of a game, for example, the matchmaker 101 is a server owned by a game company that keeps track of all of the dedicated servers $s_1 \, s_2 \ldots s_j$ that are operating to host the game. The client's request to the matchmaker includes a set of parameters (e.g., game type, number of players, game map, etc.) along with the client's public key, as shown in 301. The client's request 301 to the matchmaker 101 can be conducted over, for example, a REST API. This request 301 includes passing up to the matchmaker the client's public key.

Because the matchmaker 101 knows the client's desired server parameters, it can identify servers $s_1 \, s_2 \ldots s_j$ that satisfy the client's request 101. With a set of dedicated servers $s_1 \, s_2 \ldots s_j$ identified, the matchmaker 101 can create a route request and send it to the master server 102, as shown in 302.

A route request 302 includes the public key of the client, as well as the public keys and IP addresses and ports of the dedicated servers $s_1 \, s_2 \ldots s_j$ that satisfy the client's initial request 301 (keeping in mind that a plurality of dedicated server is not necessary in a route request). It is not necessary to know the client's IP address in this process. Instead, the master server 102 needs to know the client's public key at a minimum, because the client's address in the flow route is set to "none" and can be determined by the first relay $r_1$ as the address which the request packet was sent from.

Figure 4:
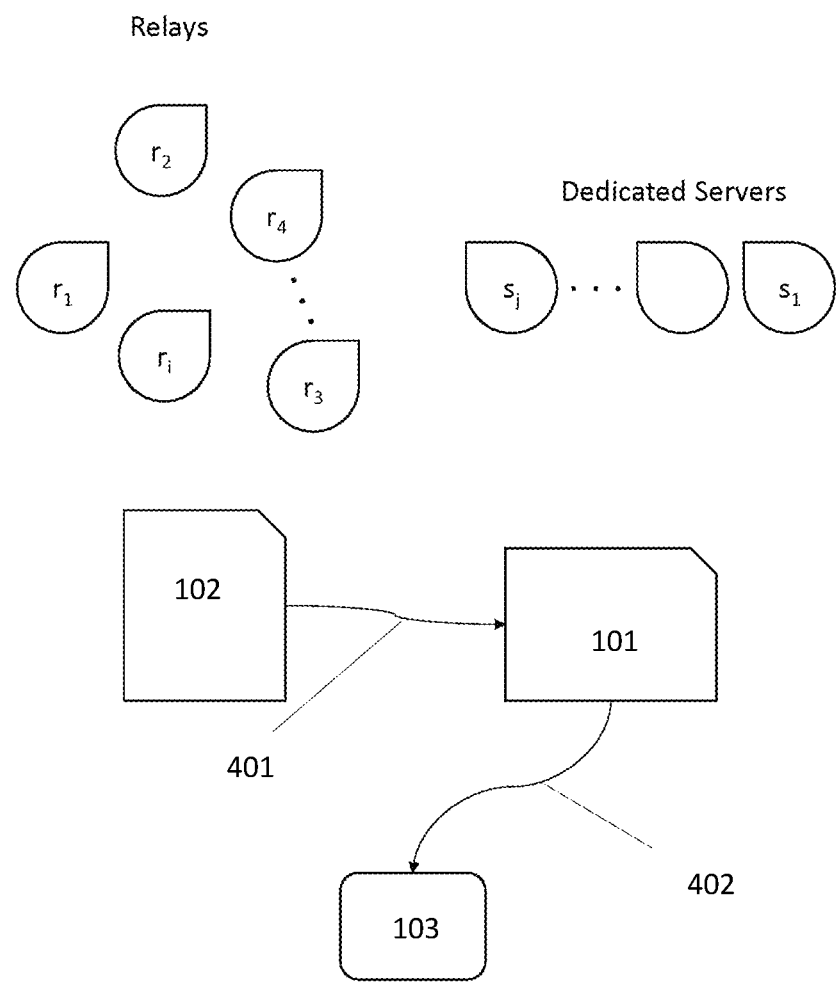
FIG. 4 illustrates a master server returning an array of flow routes to the client.

The master server 102 receives the route requests 302 from the matchmaker 101 (e.g., via REST API), and the master server 102 identifies the best routes for each of the dedicated servers $s_1 \, s_2 \ldots s_j$ identified by the matchmaker 101 according to some criteria (for example, minimum latency, packet loss, jitter, etc.). The master server 102 then responds to the matchmaker 101 with an array of routes from the client to servers 401, each route corresponding one server in the list of dedicated servers in the route request, as shown in FIG. 4. In alternative embodiments of the present invention the Master server 102 may respond to the Matchmaker's request by sending a Session ID and an array of Session Tokens to the Matchmaker 101. Each Session Token corresponds to an identified Dedicated Server, and the Session ID identifies the Client's session. In some embodiments, the Session ID is number (e.g., a 64-bit number, a 128-bit number, etc.). While not a requirement, it is preferable that each Session ID is unique.

Each flow route has flow tokens. The first flow token corresponds to the client 103. It is encrypted with the client's public key and the master server's private key. Tokens coming after the client token but before the server token (the last token) correspond to relays, and are each encrypted with master server's private key and the public key of the corresponding relay. The last flow token in each flow route is encrypted with server's public key and the master server's private key. The encrypted flow tokens are then transmitted 402 to the client 103 by the matchmaker 101.

By having the master server send the array of routes to server to the matchmaker instead of directly to the client, the client never gains access to information about the master server (e.g., the IP address). This helps to protect the master server (which can be owned/operated by, for example, a separate entity than the entity that owns/operates the matchmaker) from attack.

Figure 14:
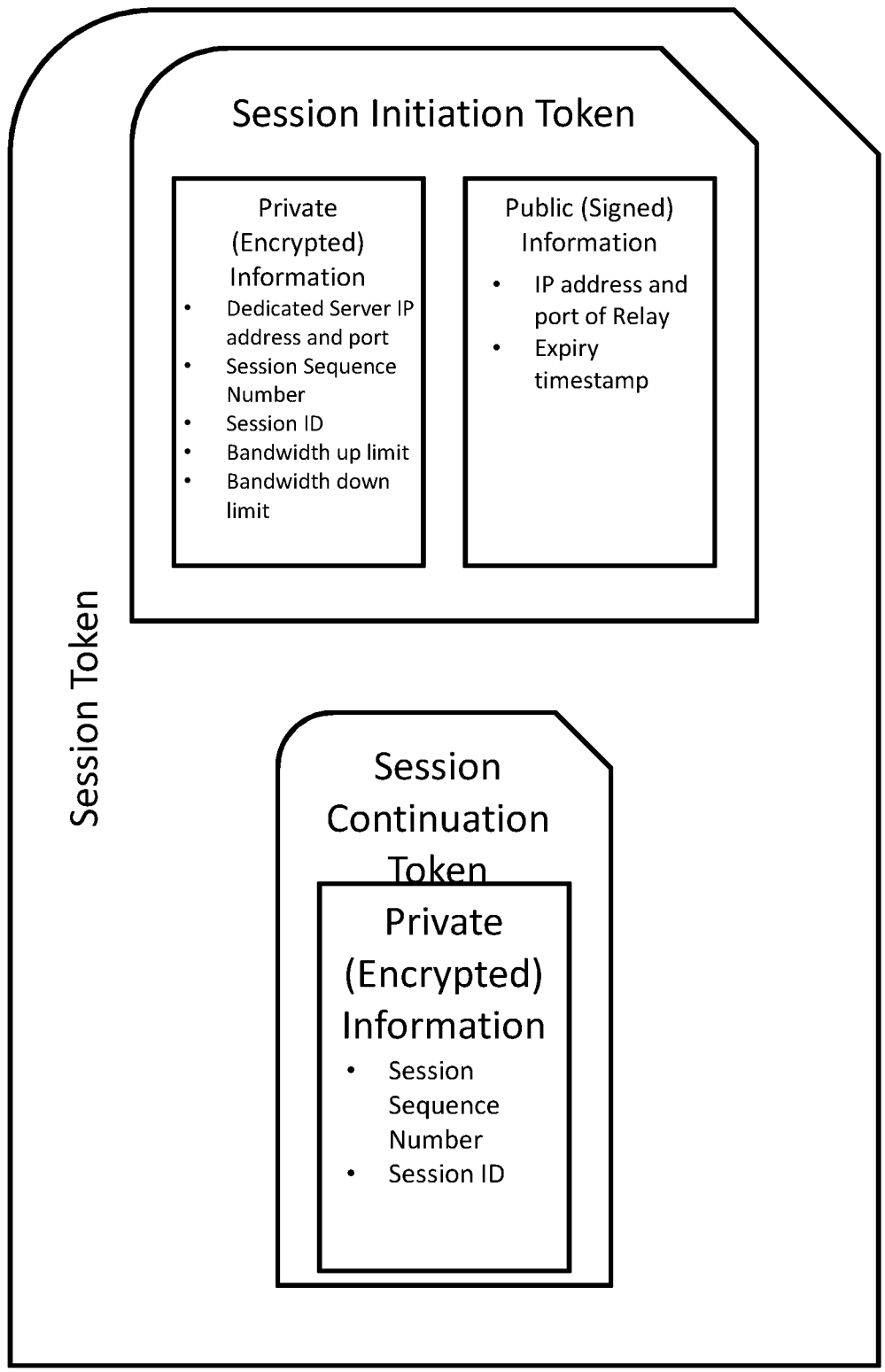
FIG. 14 illustrates a Session Token according to aspects of the present disclosure.

In alternative embodiments Session Tokens are used to maintain a secure connection. The contents of a Session Token are seen in FIG. 14. Session Tokens include two sub-tokens: a Session Initiation Token and a Session Continuation Token. The Session Initiation Token includes both private and public information. Private information is encrypted asymmetrically, such that it can be created only by the Master Server, and read only by the corresponding Relay. Public information is readily readable, but it is signed such that its authenticity can be verified by a recipient. The private information in the Session Initiation Token includes, for example, a Dedicated Server IP address and port, a Session Sequence Number, the Session ID, a bandwidth up limit, and a bandwidth down limit. The public information in the Session Continuation Token includes, for example, an IP address of a Relay and an expiry timestamp. The Session Continuation Token has private information including a Session Sequence Number and a Session ID.

Figure 5A:
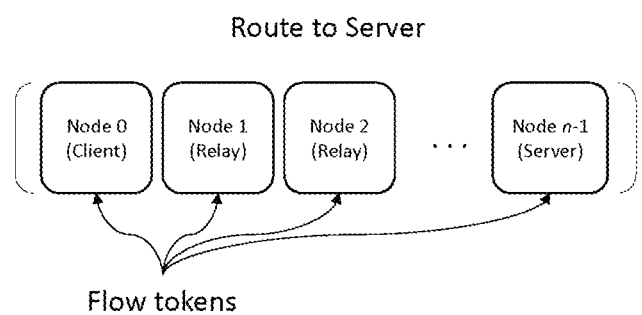
FIG. 5A illustrates a flow route.
Figure 5B:
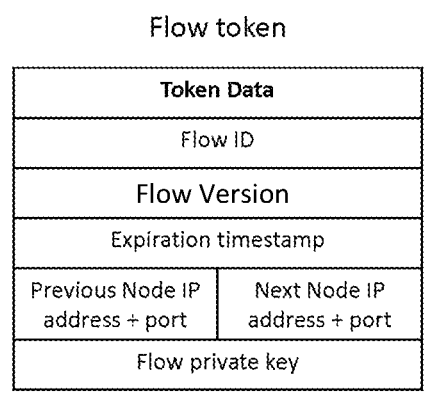
FIG. 5B illustrates a flow token.

FIG. 5A shows an embodiment of a flow route. Within each flow route are a series of flow tokens, each flow token corresponding to a particular node. Node 0 always corresponds to the client, and the last node (e.g., node n−1) always corresponds to the dedicated server. All nodes in between (e.g., nodes 1 through n−2) correspond to relays, and are ordered in a sequence indicating a desired flow route. FIG. 5B shows an embodiment of a flow token, which includes: Flow ID, Flow version, expiration timestamp, previous node IP address+port, next node IP address+port, and a flow private key. In some embodiments, the previous node IP+address+port in the flow token, may be substituted with a "none" entry, indicating that the relay corresponding to that token should use the address that the request packet was sent from as the previous IP address+port for that flow entry.

Figure 6:
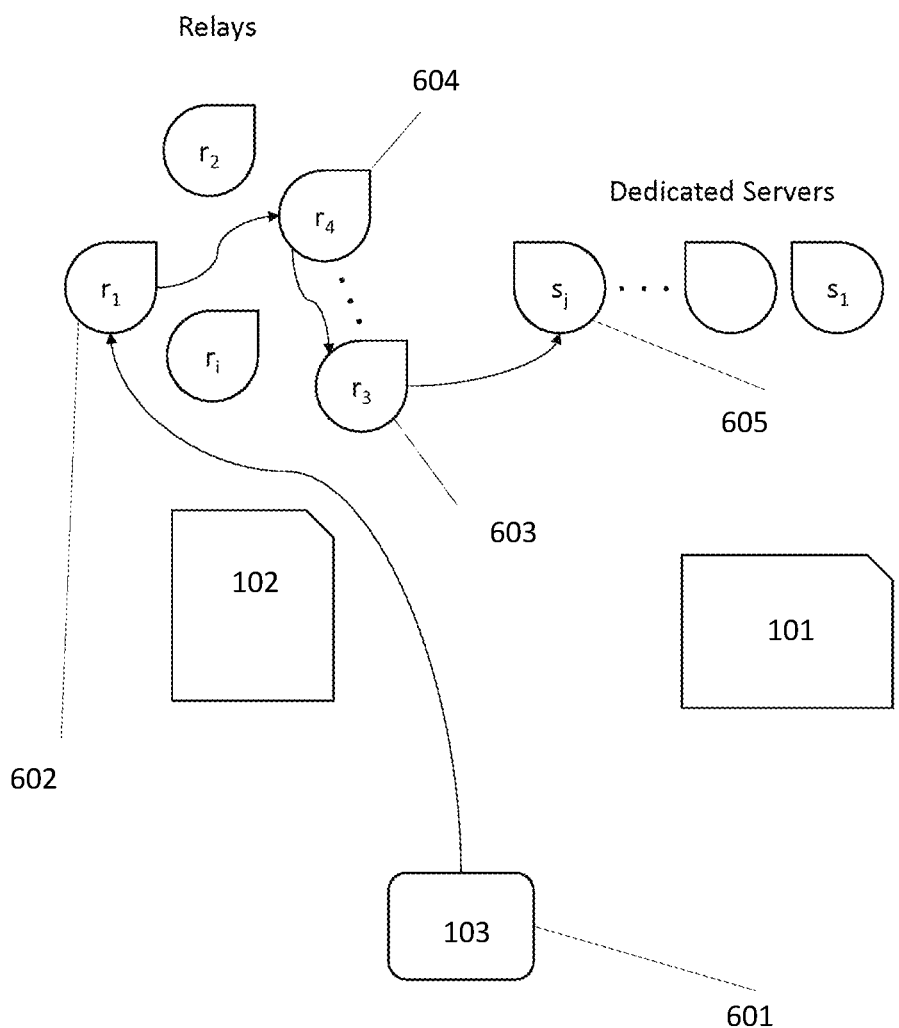
FIG. 6 illustrates a client sending a request packet to a dedicated server.
Figure 7:
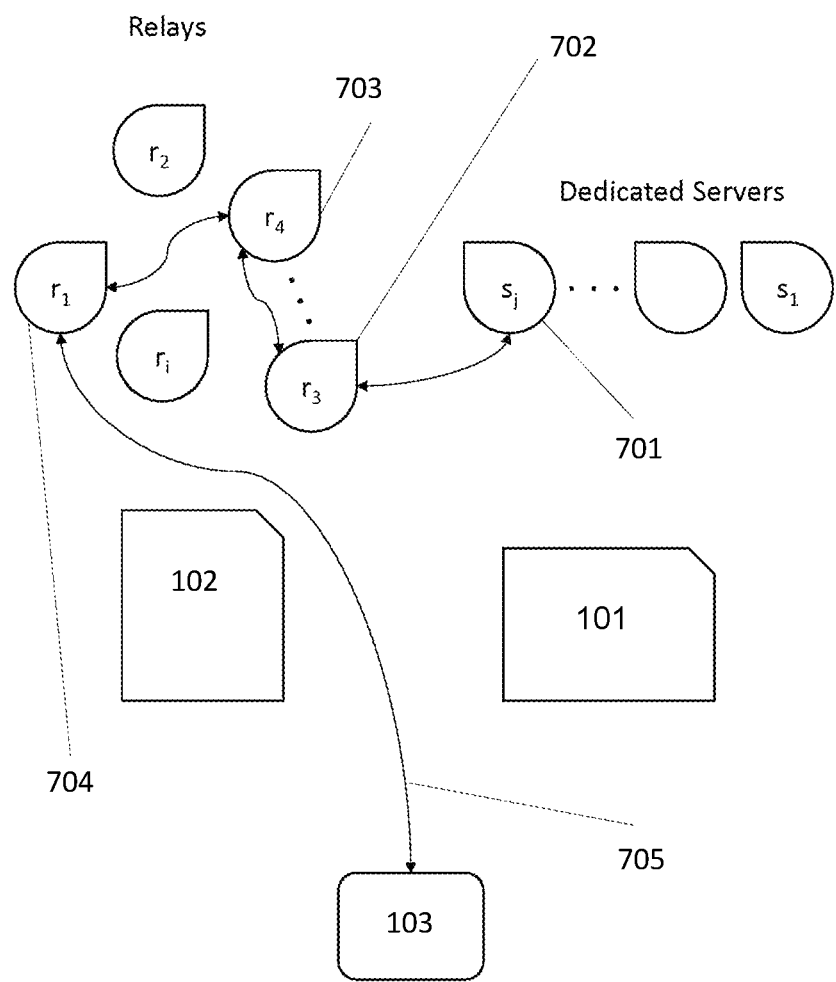
FIG. 7 illustrates a response packet sent to a client in response to a request packet received from that client.

FIGS. 6 & 7 illustrate how a flow can become established between a client 103 and a server $s_j$ via any number of relays $r_1, r_2 \ldots r_i$. Although the embodiment shown in the figures incorporate three relays, it is contemplated that any number of relays can be implemented using embodiments of the inventive subject matter.

FIGS. 6 & 7 demonstrate the actions undertaken for a single flow route. In embodiments where the array of routes to server $s_j$ includes more than one route, the client iterates through each flow route until a flow is established. For example, if the client 103 and server $s_j$ are unable to establish a flow using the first flow route in some amount of time (for example, 1 second), the client 103 moves on to the second flow route to attempt to establish the flow that the second flow route contains, and does the same for the third route, etc. In some embodiments, the client 103 attempts to establish a flow using all of the flow routes simultaneously, and accepts the first flow that is established. In other embodiments, a client 103 can attempt to establish a flow using subgroups of routes to server $s_j$. Similarly in alternative embodiments using Session Tokens the Client 103 receives the session tokens from the Matchmaker 101 and can iterate through the set of Session Tokens, attempting to use each Session Token to establish a connection with a Dedicated Server via one or more relays. The client ceases to iterate through Session Tokens after it successfully establishes a connection with a Dedicated Server via one or more Relays.

Just like each node (e.g., client, relay, or server) of the inventive subject matter has a public key and private key pair, the master server 102 also has a public key and private key pair. Each time a flow route is created, each flow token within that route is encrypted using the master server's private key and the public key of the corresponding node, be that node a client, a relay or a server). Thus, each flow token can only be generated by the master server and cannot be modified by any third party, and can only be decrypted by the particular node it was generated for.

Thus, 601 shows that the client 103 receives a flow route and decrypts the first token, replacing the first token with a request packet type indicator, a prefix of a single "0" byte, creating a request packet. For context, FIG. 6 shows that there are "i" relays. This notation is used to indicate that, in the context of FIG. 6, i is any number between 4 and an arbitrary high number that is limited only by a number of relays that can reasonably be deployed in the real world (e.g., as physical or virtual devices). It is thus contemplated that there can be any number of relays between 1 and that arbitrary high number.

The client 103 is able to decrypt the first flow token in the flow route because it was encrypted using the client's public key and the master server's private key. With the first token (e.g., the token corresponding to node 0 as illustrated in FIG. 5A) replaced by a packet type indicator (e.g., 0), the flow route is converted into a request packet. The request packet thus includes one fewer tokens, and the first token in the request packet now corresponds to node 1, which is the first relay $r_1$ in the flow route. The Client then sends a series of this request packet to the first relay $r_1$ indicated in the flow route (and whose address is contained in the client's flow token as the next node IP address+port) with the ultimate goal of establishing a flow. In some embodiments, the series of request packets are sent at some frequency (e.g., 10 Hz) for a period of time (e.g., 5 seconds), while in other embodiments, a quantity of request packets is sent (e.g., 100) irrespective of time. This applies any time a node sends "a series" of packets.

In embodiments that Utilize a Session token connections are established in phases. Once the Client has begun to send packets to a Relay (e.g., the Relay indicated in the Session Token), the Client goes through two packet-sending phases. In a first packet-sending phase, the Client sends packets to the identified Relay that is prefixed with the Session Initiation Token. These packets are sent for an amount of time (e.g., 1-2 sec, 2-3 sec, 3-4 sec, 4-5 sec, 5-10 sec, 10-15 sec). After that amount of time expires, in the second packet-sending phase, the packets are prefixed with a Session Continuation Token instead of with a Session Initiation Token.

The first relay $r_1$ (which corresponds to node 1 in the flow route) receives at least one of the request packets sent from the Client 103, as shown 602. The first relay $r_1$ decrypts the first token of the request packet before replacing both the first token and the existing packet type indicator with a request packet type indicator (e.g., 0 in this case since the packet is a request packet). Because the client 103 already decrypted the original "first" token and replaced it with a request packet type indicator, the new "first" token is a token that the first relay $r_1$ (and only the first relay) can decrypt as it was encrypted using the first relay's public key and the master server's private key.

Whenever a flow token refers to the client 103 as the previous node (e.g., the flow token corresponding to the first relay in a flow route), the client will have an address type of 0 (where type 0 indicates an unknown or "none" address, type 1 indicates an IPv4 address, and type 2 indicates an IPv6 address). Anytime a request packet comes in and the corresponding token has a previous address of type 0, it is replaced with the address+port that the request packet was sent from. Thus, there is never a need for the address of the client to be included in a relay's token. This is primarily used to handle situations where the client 103 is behind network address translation (NAT) (e.g., the public IP address+port of that client is dynamically generated by a router), but the concept can be extended and used in relation to any node where a previous node has an address type of 0. This can be useful for situations where some nodes along the route are on a private network and don't expose or necessarily know their public IP addresses ahead of time.

The first relay $r_1$ then checks to see if the Flow ID and Flow version in that token already exist in the Relay's cache and where to send the packet next. If the Flow ID and Flow version are new, then the Flow ID and other contents of the token are stored in the Relay's cache. The modified request packet is then passed on to the next node in the flow route.

In embodiments utilizing Session Tokens. Session Initiation Tokens are prefixed onto packets for a limited amount of time to make certain that the Relay receives the Session Initiation Token. When a Relay receives a packet prefixed with a Session Initiation Token, the Relay first checks the expiry timestamp (which is stored as public data). If the Session Initiation Token has expired, the packet is ignored. Next, the Relay runs a signature and authentication check to make sure that the Session Initiation Token is valid and was generated by the Master Server. After this it decrypts the Session Initiation Token.

Once decrypted, the Relay then checks to see if the Session ID in the Session Initiation Token already exists in the Relay's cache. The Relay can also check the bandwidth up/down limits for the session (as indicated in the Session Initiation Token), and terminates the session if the bandwidth exceeds the limits in either direction for some period of time (e.g., 1-5 seconds, 5-10 seconds, 10-15 seconds, or another specified time). This way even if a Client has a valid Session Token, that Client still cannot DDoS the Dedicated Server.

If the Session ID is new, then the Session ID and other contents of the Session Initiation Token (e.g., all or some of the public and private information in the Session Initiation Token) are stored in the Relay's cache before sending the packet to the Dedicated Server or another relay. Before sending the packet to the Dedicated Server or another relay, the Relay strips the prefix (e.g., the Session Initiation Token) from the packet and replaces it with the Session ID and Session Sequence Number before passing the packet to the Dedicated Server $s_j$ or relay $r_i$ that was identified in the Session Token.

If the Relay finds that the Session ID in a Session Initiation Token already exists in its cache (indicating that a packet prefixed with a Session Initiation Token has already been received and recorded), then the packet is passed to the Dedicated Server or another relay. Again, before sending the packet to the Dedicated Server or another, the Relay strips the prefix (e.g., the Session Initiation Token) from the packet and replaces it with the Session ID and Session Sequence Number before passing the packet to the Dedicated Server $s_j$ or relay $r_i$ that was identified in the Session Token.

If a Relay receives packets that are prefixed with a Session Continuation Token, the Relay only checks if the Session ID already exists in Cache. If the Session ID exists in the Relay's cache, the Relay proceeds to strip the prefix and replaces it with the Session ID and Session Sequence Number before passing the packet on to the Dedicated Server. If the Session ID does not exist in cache, the packet is ignored.

FIG. 8A illustrates content in a relay's cache as needed for some embodiments of the inventive subject matter. The cache for each relay includes a table having keys and values, where a key includes the tuple {Flow ID, Flow version}, and a value corresponding to each key includes an entry. FIG. 8B shows example entry data broken into token data and runtime data. Token data includes: expiration timestamp, previous node address (e.g., IP address and port), next node address (e.g., IP address and port), and Flow private key. Runtime data includes: the time a packet was last received from a previous node, the time a packet was last received from the next node, previous node replay protection, and next node replay protection. Replay protection is discussed in more detail below.

In some embodiments of the present disclosure the second relay $r_4$ (which corresponds to node 2 the flow route) receives at least one of the request packets sent from node 1 (i.e., relay $r_1$), as shown in 603. The second relay $r_4$ decrypts the first token of the request packet before once again replacing both the first token and the existing packet type indicator with a request packet type indicator (e.g., 0 in this case since the packet is a request packet). Because the first relay $r_1$ already decrypted the previous "first" token and replaced it with a request packet type indicator, the new "first" token is a token that the second relay $r_4$ (and only the second relay) can decrypt as it was encrypted using the second relay's public key and the master server's private key.

The second relay $r_4$ then checks to see if the Flow ID and Flow version in that token already exist in the Relay's cache and where to send the packet next. If the Flow ID and Flow version are new, then the Flow ID and other contents of the token are stored in the Relay's cache. The modified request packet is then passed on to the next node in the flow route.

The third relay $r_3$ (which corresponds to sequentially the next node after node 2 in the original flow route) receives at least one of the request packets sent from node 2 (i.e., relay $r_4$), as shown in 604. The third relay $r_3$ decrypts the first token of the request packet before once again replacing both the first token and the existing packet type indicator with a request packet type indicator (e.g., 0 in this case since the packet is a request packet). Because the second relay $r_4$ already decrypted the previous "first" token and replaced it with a request packet type indicator, the new "first" token will be a token that the third relay $r_3$ (and only the third relay) can decrypt as it was encrypted using the third relay's public key and the master server's private key.

The third relay $r_3$ then checks to see if the Flow ID and Flow version in that token already exist in the Relay's cache and where to send the packet next. If the Flow ID and Flow version are new, then the Flow ID and other contents of the token are stored in the Relay's cache. The modified request packet is then passed on to the next node in the flow route. Although in the figures the third relay $r_3$ is the final relay, it is contemplated that as many or as few relays as necessary can be used to find an optimal flow route.

Finally, a dedicated server $s_j$ (which corresponds to the final node in the request packet) receives at least one of the request packets sent from node 3 (i.e., relay $r_3$), as shown in 605. The dedicated server $s_j$ decrypts the first token of the request packet (which now corresponds to a flow token only the server can decrypt, since it is encrypted with the master server's private key and the server's public key) and checks to see if the Flow ID in that token already exist in the Dedicated Server's cache. If the Flow ID is new, then the Flow ID and other contents of the token are stored in the Dedicated Server's cache. The server responds to each valid request packet with a response packet sent to the previous node in the flow route.

For security reasons, packet types 1, 2, and 3 are "signed" with the flow private key, which is included in each flow token, and is the same for each flow entry corresponding to this flow on every node involved (e.g., the client, the relays and the server). This allows each node to trivially reject packets sent by unauthorized parties (e.g., parties that don't know the flow private key). It is important to note that the response and payload packets (e.g., types 1, 2, and 3) are not encrypted, they are only signed. Thus, the contents are readable by anyone, but a 3rd party cannot generate or modify the Flow ID or Flow version number in the flow header for these packet types. For these embodiments to work, packet types 1, 2, and 3 must have a packet sequence number (e.g., a "nonce" number that is used only once), and a keyed-hash message authentication code (HMAC). To avoid the packet sequence number being used more than once, packets of type 1, 2 and 3 sent in the client to server direction have the high bit of the 64 bit sequence number set to 0, and packets of type 1, 2 and 3 sent in the server to client direction have the high bit of the 64 bit sequence number set to 1.

A more secure connections may be process may be obtained in the alternative embodiment utilizing Session Tokens. In embodiment using Session Tokens it is contemplated that each Relay has a corresponding public key/private key pair. This facilitates encryption of tokens by the Master Server to ensure tokens (e.g. Session Tokens) may only be read by the Relay that the Master Server generated the tokens for, via asymmetric encryption. This ensures that if one Relay is compromised, it does not compromise all other Relays in the system. In some embodiments, Relays need a certificate to register with the Master Server, allowing the certificate of compromised Relays to be revoked. In some embodiments, Relays automatically generate new public key/private key pairs (e.g., at regular or irregular intervals such as 5-10 minutes, or every hour or any combination of intervals within that range). Each time a Relay generates a new public key/private key pair, the Relay communicates its new public key to the Master Server.

Additionally in embodiments utilizing Session Tokens according to aspects of the present disclosure, it is contemplated that the Master Server also has its own public key/private key pair. The Master Server gives its public key to the Relays. Thus, Relays can decrypt, but cannot write, Session Tokens. It is also contemplated that a Relay can sign, or encrypt and sign packets that it exchanges with a Dedicated Server.

Figures 9A, 9B:
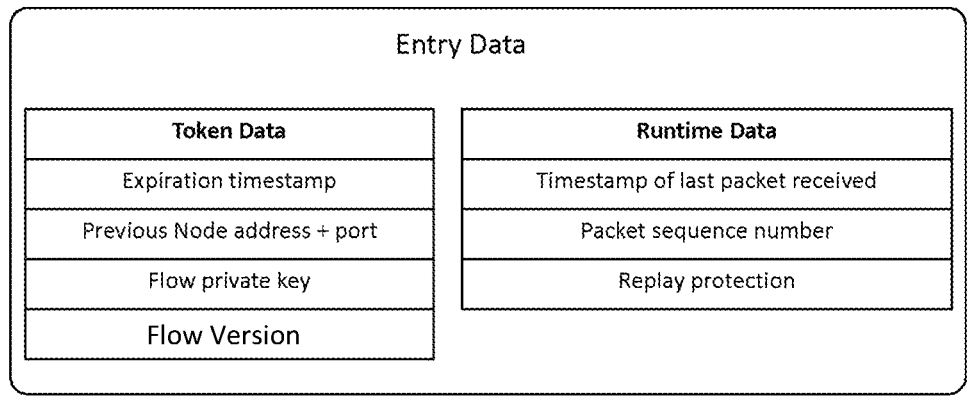
FIG. 9A illustrates a server's cache.
FIG. 9B illustrates the token data in a server's cache.
Figure 10:
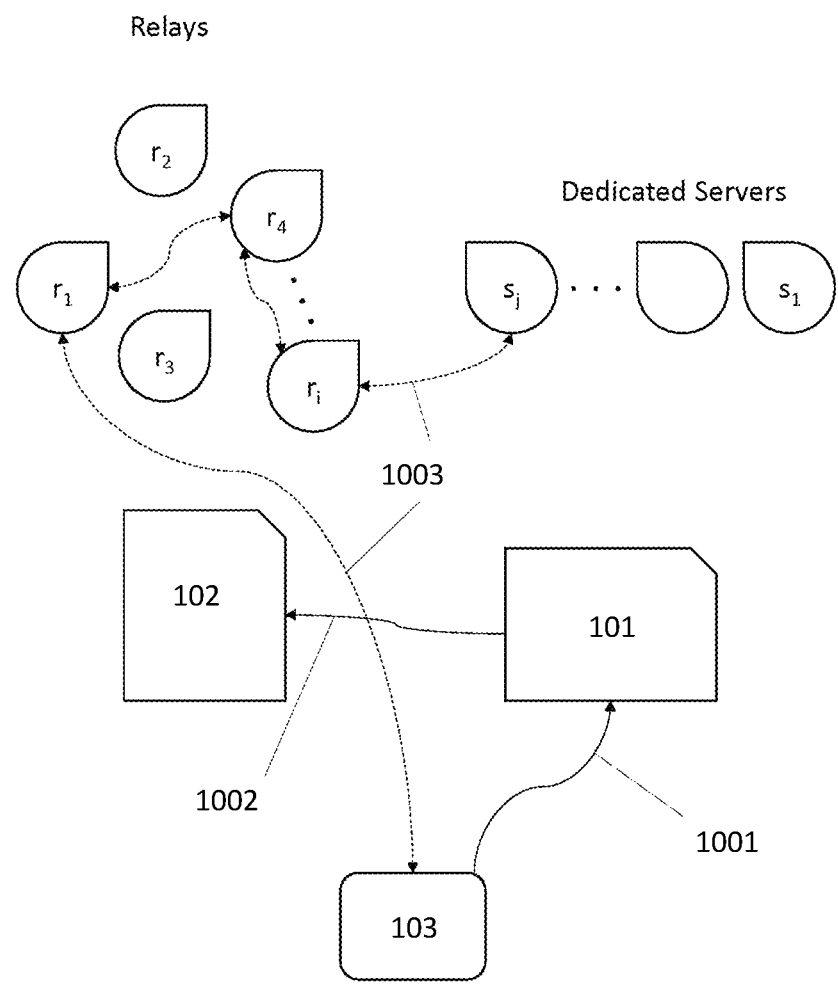
FIG. 10 illustrates a client requesting an updated flow route.

Much like relays, dedicated servers have a cache to store data related to different flows. This enables a server to keep track that a particular flow relates to a particular client, and so on. FIG. 9A shows an example of how a server can store keys and values related to flows. A key includes the Flow ID, and a value corresponding to each key includes an entry. The entry has token data and runtime data, shown in FIG. 9B. Token data includes: an expiration timestamp, a previous node IP address+port, a flow private key, and a Flow version. The runtime data includes the time the last packet was received, a packet sequence number, and a replay protection buffer.

With a valid request packet is received at the dedicated server $r_j$, the dedicated server $r_j$ replies with response packets to the previous node $r_3$, as shown in 701. Ultimately, the response packets are forwarded back to the client 103 via the same flow route defined by the request packet, but in reverse. It should be understood that the reverse flow route need not be limited to the exact same route as the forward flow and the reverse flow may take any number of other As shown in 702, relay $r_3$ receives a response packet from the dedicated server $s_j$ that is signed using a flow private key (e.g., the flow private key contained within the token data that the dedicated server decrypted from the request packet that ultimately arrived at the dedicated server $s_j$ passed along the set of relays in the flow route). Relay $r_3$ looks up the flow entry in its cache by flow ID and flow version, then checks sees if the signature is valid. If the signature is valid, the relay forwards the response packet to the previous relay $r_4$.

As shown in 703, relay $r_4$ receives a response packet from relay $r_3$ that is signed using the flow private key. Relay $r_4$ looks up the flow entry by flow ID and flow version, and then sees if the signature is valid. If the signature is valid, the relay forwards the response packet to previous relay $r_1$.

As shown in 704, relay $r_1$ receives a response packet from relay $r_4$ that is signed using the flow private key. Relay $r_1$ looks up the flow entry by flow ID and flow version, and then sees if the signature is valid. If the signature is valid, the relay forwards the response packets to the previous node (in this case, the Client or node 0).

When the client receives the response packet from the first relay, the client does the same signature check that all previous nodes completed, and if the packet passes, the client considers the flow to be "established." Once a flow is established, the client has confirmation that payload packets (e.g., packet types 2 and 3) can be exchanged between the client and the server across the flow route. Payload packets, like response packets, have their flow header signed by the flow private key, and can be structured as follows: [2 or 3][packet sequence][Flow ID][flow version][hmac](payload data).

In some embodiments, the client can begin sending payload packets to the dedicated server before receiving a response packet from the dedicated server. This can help to minimize latency to establish a flow since, in most cases the request packets will arrive at each relay and the server before the payload packet, thus "punching" through the flow route so that packets moving from client to server can be forwarded immediately to the next node in the common case.

In some instances, the flow can become unreliable or slow for any number of reasons (e.g., a node comes under attack, a node begins to slow down unexpectedly, packet loss becomes unacceptably high, etc.). In other cases, the existing flow route may still be of high quality, but a better flow route has become available. In these instances, it can become necessary for the flow route to be updated.

While payload packets continue to exchange between the client and the dedicated server via the existing flow route 1003 (using the original Flow ID and flow version number corresponding to that flow route), the client 103 can request an updated flow route from the matchmaker 101, as shown in 1001. The request passes the client's Flow ID (e.g., the ID corresponding to the existing flow linking the client to the server) and Flow version to the matchmaker 101 so that the server will recognize the new flow route as belonging to the same logical client session, but being more recent (e.g., an updated version of the existing flow). In embodiments using Session tokens the relocation request passes the Client's previous Session Token to the Matchmaker. It is important to use the same Session Token so that a connection can be maintained between the Client and the same Dedicated Server that the Client is already connected to. The only change that ultimately occurs is a change in Relay.

Figure 11:
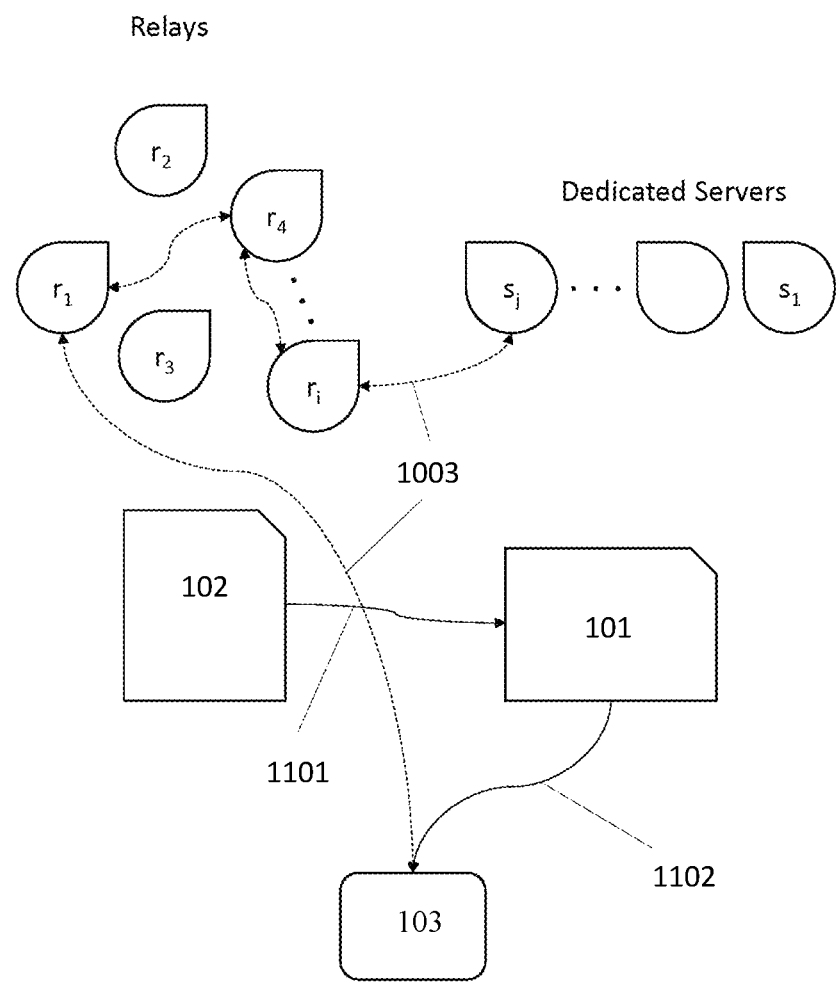
FIG. 11 illustrates a master server sending an updated flow route to a client.

The matchmaker 101, as shown in 1002, then sends the client's relocation request, along with the Flow ID and Flow version, to the master server 102. The master server 102, as shown in 1101 of FIG. 11, then responds with a new flow route having the same Flow ID, but with a new flow route (e.g., a different set of relays) leading to the same Dedicated Server $s_j$ and an incremented Flow version, so this route can be determined to be more recent version of the existing flow route. Similarly in embodiments using Session Tokens the Matchmaker sends the relocation request, including the previous Session Token, to the Master Server. The Master Server responds with a new Session Token having the same properties as the previous Session Token, except the new Session Token points to one or more new Relays that have been selected by the Master Server, and the Session Sequence Number is incremented.

Figure 12:
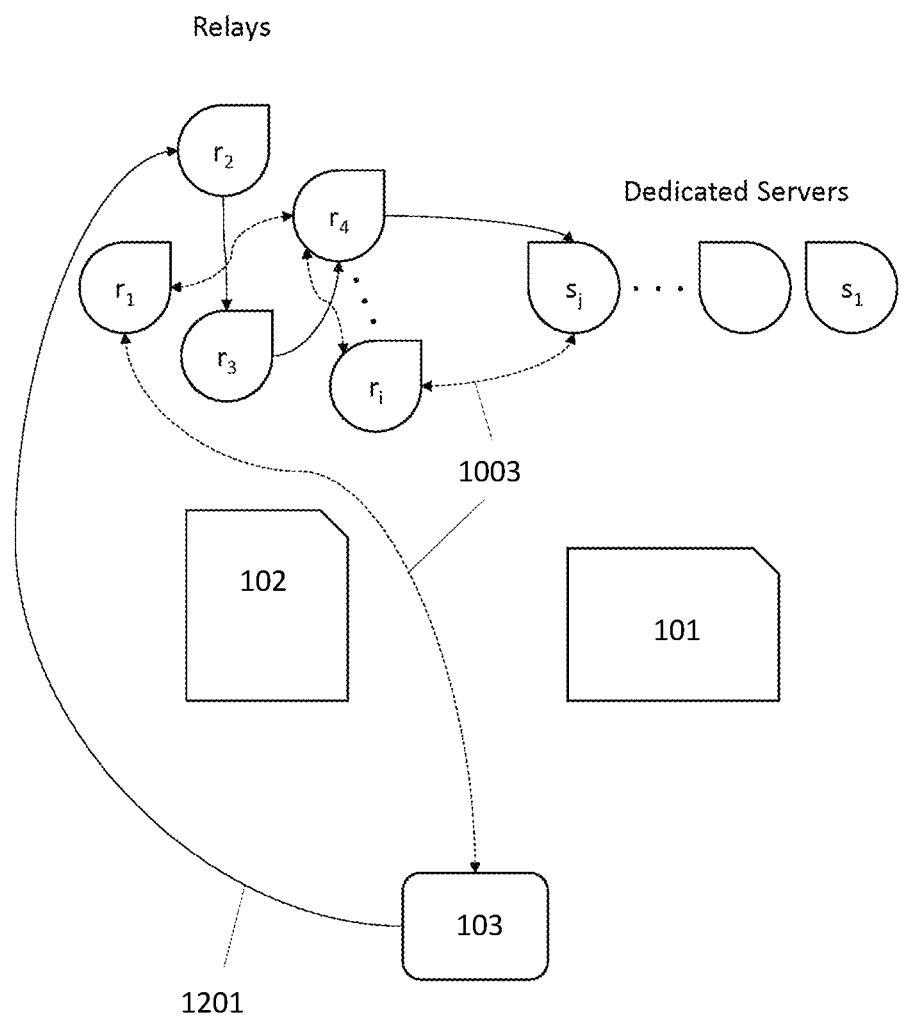
FIG. 12 illustrates a request packet for the updated route passing from client to server while the existing route is maintained for payload packets.
Figure 13:
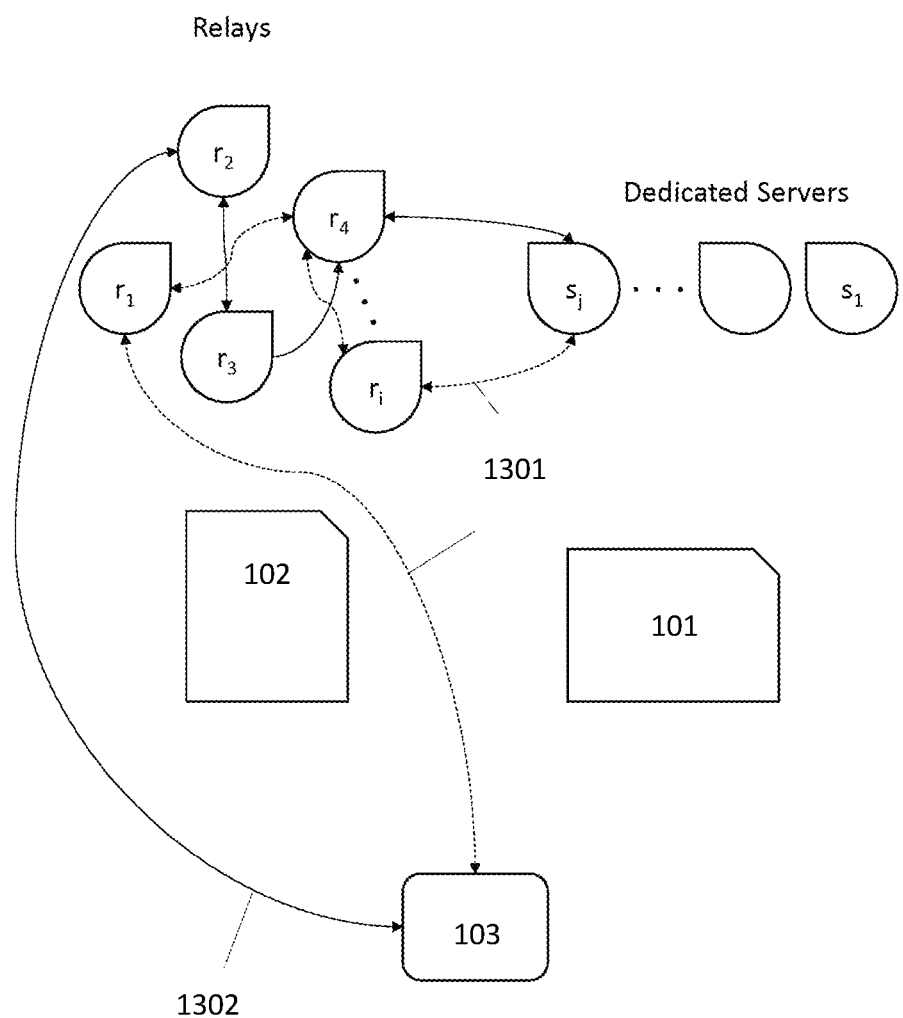
FIG. 13 illustrates a response packet being sent to a client in response to an updated request packet being received from that client.

Next, as shown in 1102, the updated flow route (or in some embodiments Session Token) is sent from the matchmaker 101 to the client 103. From there, as shown in FIG. 12, the client 103 uses the updated flow route to create a request packet 1201, which it uses to undergo the same process as described with respect to FIG. 6 to establish a new flow. Once the client 103 receives a response packet from the server $s_j$ via the updated flow route 1302, as shown in FIG. 13 (and as described more fully with respect to FIG. 7), the updated flow is established. Meanwhile, payload packet exchange continues through the existing flow route only until the dedicated server $s_j$ receives the updated request packet corresponding to the updated flow route transmitted across the new set of relays $r_2$, $r_3$, $r_4$, in the updated route 1301. After receiving the request packet, the Dedicated Server $s_j$ begins sending payload packets to the client 103 via the updated flow route 1302, and receives packets for that client session only from the updated flow route, ignoring any packets sent from the client 103 along the previous flow route. The client 103 for its part, immediately starts sending client to server payload packets along the updated flow route, while in the transition period it accepts server to client payload packets from either the existing or updated route. Once the updated route is established, the client times out the previous route and stops accepting packets sent to it along that route, and the updated route is fully established and the transition to the updated flow route is complete.

In the case of Session Token flow methods, relocation requests are handled like connection initiation with Session Tokens as described above. Except that Packets are sent to the relay identified by the Session Initiation token for a limited amount of time. After that amount of time expires, in the second packet-sending phase, the packets are prefixed with a new Session Continuation Token instead of with the new Session Initiation Token. If a Relay receives a packet that is prefixed with a Session Continuation Token, the Relay runs a signature and authentication check to make sure the Session Continuation Token is valid and was generated by the Master Server, after this it decrypts the Session Continuation Token. Once decrypted, the Relay then checks to see if the Session ID in the Session Continuation Token already exists in the Relay's cache.

In the case of the Session token connection method, if the Session ID exists in a Relay's cache, the Relay proceeds to strip the prefix (e.g., the Session Continuation Token) and replaces it with the Session ID and Session Sequence Number before passing the packet on to the Dedicated Server or one or more other relays. If the Session ID does not exist in cache, the packet is ignored.

According to aspects of the Token Session Connection method of the present disclosure packets sent via the new Relay will all have an incremented Session Sequence Number, such that the Dedicated Server can compare the previous Session Sequence Number and the new Session Sequence Number to determine that the new Relay is more recent than the old Relay. In other words, the Session Sequence Number changes (e.g., increments) each time a Relay relocation occurs. For example, the Session Sequence Number could count up from 1 to 2 after a Relay relocation occurs. This allows the Dedicated Server to compare Session Sequence Numbers and to only accept packets having the most recent Session Sequence Number (i.e., 2, in this case).

The Dedicated Server that the Client has connected to running the Session Token connection method according to alternative aspects of the present disclosure, will always be checking the Session ID (e.g., to know which client is which) and also the Session Sequence Number. It is important for the Dedicated Server to check the Session Sequence Number so that, in the event of a Session Relocation, the Dedicated Server will know which packets to listen to and which to ignore. For example, although packets will still be sent from the Client to the Dedicated Server during the process of relocating a connection to a Server via a new Relay, as soon as packets begin to show up from the new Relay, the packets received from the old Relay can be ignored. The Dedicated Server will know which packets to keep based on the Session Sequence Number based on recency of that number. For example, if a Session Sequence Number starts at 1 and increments to 2 after a Session Relocation, the dedicated server (though for a time it may receive packets from both Relays) will only listen to packets with the most recent Session Sequence Number of 2.

It is contemplated that timeouts can occur at any node along a flow route. For example: if a client does not receive any packets from the first relay for some duration of time (e.g., 1-10 and preferably 5 second) it times out; if the server does not receive any packets from the relay before it for a particular flow for some duration of time (e.g., 1-10 and preferably 5 second) it times out and removes that flow entry; and if a relay does not receive any packets from the previous node for some duration of time (e.g., 1-10 and preferably 5 second), or does not receive any previous packets from the next node for some duration of time (e.g., 1-10 and preferably 5 second), it times out and removes that flow entry.

Replay protection, mentioned briefly in the preceding paragraphs, stops an attacker from recording a valid packet and replaying it back later in an attack on a node (e.g., a client, a relay, or a server). To enable replay protection, several measures can be implemented. For example, encrypted and/or signed packets can be sent with 64-bit sequence numbers that start at zero and increment with each packet sent. Sequence numbers can be included in the packet header and can be read by the node receiving the packet (e.g., prior to decryption or signature check). Moreover, sequence numbers can be used as the nonce for packet encryption, so any modification to the sequence number fails the encryption signature check.

Replay protection thus operates as follows. First, packets are received and stored in a node's replay buffer having a set replay buffer size. The replay buffer size determines a quantity of packets that can be stored in the replay buffer (e.g., 64-128, 128-256, 256-512, 512-1028 packets). Replay buffer size is implementation specific. In some embodiments, a few seconds worth of packets at a typical send rate (20-60 Hz) is supported. For example, a replay buffer size of 256 entries per-client should be sufficient for most applications. Each packet received has an associated sequence number. Any packet having a sequence number that is older than the most recent sequence number received (e.g., received with a packet), minus the replay buffer size, is discarded on the receiver side.

For example, if a replay buffer size is 100, and the most recent packet received has a sequence number of 600, a packet having a sequence number of 599 or less (i.e., 1 less than 600 minus 100) would be discarded. When a new packet arrives that has a more recent sequence number than the previously most recent sequence number received, the sequence number associated with the new packet is updated on the receiver side and the new packet is accepted. If a packet arrives that is within replay buffer size of the most recent sequence number, it is accepted only if its sequence number has not already been received. If a packet is received having a sequence number that has already been received, that packet is ignored.

Implementation

Figure 15:
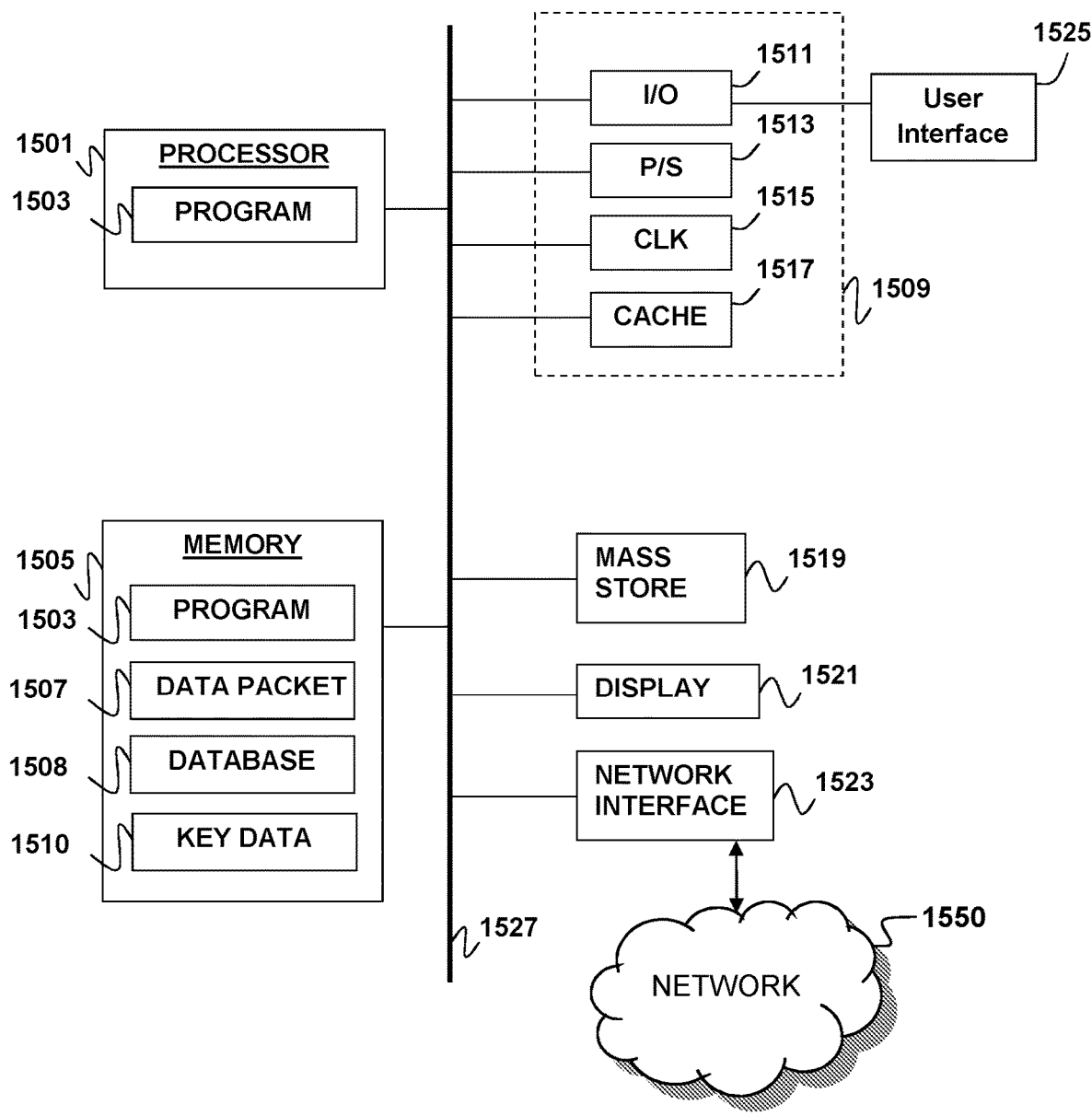
FIG. 15 illustrates a system that may be used to implement a node relay communication method according to one aspect of the present disclosure.

Aspects for the present disclosure may be implemented on a suitably configured computer apparatus such as a server (e.g. Matchmaking Server, Master Server etc.), personal computer, network relay and the like. FIG. 15 illustrates a block diagram of a system 1500 that may be used to implement a node relay communication method according to one aspect of the present disclosure. The apparatus 1500 generally may include a processor module 1501 and a memory 1505.

The processor module 1501 may include one or more processor cores. The processor module 1501 may include multiple processor cores, e.g., if parallel processing is to be implemented. Examples of suitable multi-core processors, include, but are not limited to dual-core processors, quad-core processors, processor architectures having a main processor and one or more co-processors, cell processor architectures, and the like. The ability to process data in parallel saves valuable processing time, leading to a more efficient and streamlined system for emotion recognition.

The memory 1505 may be in the form of an integrated circuit, e.g., RAM, DRAM, ROM, and the like. The memory 1505 may also be a main memory that is accessible by all of the processor modules. In some embodiments, the processor module 1501 may have local memories associated with each core. A program 1503 may be stored in the main memory 1505 in the form of processor readable instructions that can be executed on the processor modules. The program 1503 may be configured implement the method for communication between nodes using tokens as described above and in FIGS. 1, through 13. The program 1503 may be written in any suitable processor readable language, e.g., C, C++, JAVA, Assembly, MATLAB, FORTRAN, and a number of other languages. During operation of the Program Data Packets 1507 may be stored in the memory before they are transmitted to another node. The Program may cause a Database 1508 to store Packet Data and be indexed according to Flow ID and/or a Flow Version in Memory 1505. Additionally the Database may store public keys or private keys for decryption of tokens. In some embodiments where the system 1500 is a Master Server the memory 1505 may store a private key for the encryption of a token data. Additionally in the case of a Master Server, the Program 1503 may cause the system to plot a flow route through the network 1550 for a client device using the network interface 1523 and provide a series of flow tokens defining that flow route. During execution of the program 1503, portions of program code and/or data may be loaded into the memory or the local stores of processor cores for parallel processing by multiple processor cores.

The apparatus 1500 may also include well-known support functions 1509, such as input/output (I/O) elements 1511, power supplies (P/S) 1513, a clock (CLK) 1515, and a cache 1517. The apparatus 1500 may optionally include a mass storage device 5119 such as a disk drive, CD-ROM drive, tape drive, or the like to store programs and/or data. The apparatus 1500 may optionally include a display unit 1521 to facilitate interaction between the apparatus and a user. The display unit 1521 may be in the form of a cathode ray tube (CRT) or flat panel screen that displays text, numerals, graphical symbols or images. The user interface 1525 may include a keyboard, mouse, joystick, touch screen, touch pad, or other device that may be used in conjunction with a graphical user interface (GUI).

The components of the apparatus 1500, including the processor 1501, memory 1505, support functions 1509, mass storage device 1519, user interface 1525, network interface 1523, and display 1521 may be operably connected to each other via one or more data buses 1527. These components may be implemented in hardware, software or firmware or some combination of two or more of these.

Thus, specific compositions and methods of establishing flows for bidirectional packet exchange have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A node system comprising;
    a processor
    a memory
    wherein the node system is configured to implement a method for node relay communication comprising;
    a) receiving a description of a flow entry in a packet from another node, the description of the flow entry including an address in a flow, a Flow identifier (ID) of the flow entry, a flow version, an address and port information for one or more other nodes in the flow, and a private key, wherein the address and port information for one or more other nodes in the flow includes an internet protocol (IP) address and port for a next node in the flow;
    b) storing the flow entry and the private key in a database indexed by Flow ID;
    c) receiving a packet, wherein the packet comprises an authentication code and packet data including packet sequence information and a Flow ID of the packet;
    d) performing a look up in the database of a flow entry corresponding to the Flow ID of the packet; and
    e) ignoring the packet or forwarding the packet to the IP address of the next node in the flow, depending on the result of the look-up.

2. The system of claim 1 wherein e) comprises ignoring the packet if no flow entry exists.

3. The system of claim 1 wherein performing a lookup in the database at d) further comprises checking that the authentication code of the packet indicates that the packet data was signed with a flow private key matching the private key in the flow entry in the database.

4. The system of claim 3 wherein e) comprises ignoring the packet if the packet data was not signed with a flow private key matching the private key in the flow entry.

5. The system of claim 3 wherein e) further comprises testing the packet sequence number against a replay protection buffer for packets received from the next node in the flow, if the packet data was signed with a flow private key matching the private key in the flow entry in the database and if the packet has already been received, or is old, ignoring the packet.

6. The system of claim 5 wherein e) further comprises forwarding the packet without modification to a previous node and/or the next node in the flow, if the packet data was signed with a flow private key matching the private key in the flow entry in the database and the packet has not already been received and the packet is not old.

7. The system of claim 6 further comprising updating a timestamp in the flow entry of the last packet received to the current timestamp.

8. The system of claim 6 wherein the packet is received from the previous node and the system forwards the packet, without modification, to the next node.

9. The system of claim 6 wherein the packet is received from the next node and the system forwards the packet, without modification, to the previous node.

10. The system of claim 6 further comprising f) removing the flow entry from the database if packets with the Flow ID of the flow entry have not been received for a predetermined period of time from the previous node and/or the next node, and ceasing to forward packets with the Flow ID of the removed flow entry.

11. The system of claim 1 wherein the database is also indexed by Flow Version.

12. The system of claim 1 wherein the packet includes a Flow Version.

13. The system of claim 12 wherein performing the look up in the database includes looking using the Flow Version in the packet.

14. The system of claim 1 wherein a) comprises receiving the description of the flow entry from a master server.

15. The system of claim 1, wherein a) comprises receiving the description of the flow entry in a packet from another node containing one or more flow tokens, each flow token including the Flow ID, a flow version, an address and port information for one or more other nodes in the flow, and a flow private key.

16. The system of claim 15, wherein the packet from the another node includes an IP address and port for a previous node.

17. The system of claim 15, further comprising attempting to decrypt a first flow token in the packet from the another node using a node private key and a master server public key; and
    modifying the packet by removing the first flow token and forwarding the resulting modified packet on to a next node internet protocol (IP) address and port in the first flow token when the attempt to decrypt the first flow token succeeds.

18. A non-transitory computer readable medium having computer readable instructions embodied therein, the computer readable instructions being configured to implement a node relay communication method when executed the node relay communication method comprising;
    a) receiving a description of a flow entry in a packet from another node, the description of the flow entry including an address in a flow, a Flow identifier (ID) of the flow entry, a flow version, an address and port information for one or more other nodes in the flow, and a private key, wherein the address and port information for one or more other nodes in the flow includes an internet protocol (IP) address and port for a next node in the flow;
    b) storing the flow entry and the private key in a database indexed by Flow ID;
    c) receiving a packet, wherein the packet comprises an authentication code and packet data including a packet sequence and a Flow ID of the packet;
    d) performing a look up in the database of a flow entry corresponding to the Flow ID of the packet; and
    e) ignoring the packet or forwarding the packet to the IP address of the next node in the flow, depending on the result of the look-up.

19. The non-transitory computer readable medium of claim 18 wherein e) comprises ignoring the packet if no flow entry exists.

20. The non-transitory computer readable medium of claim 18 wherein performing a lookup in the database at d) further comprises checking that the authentication code of the packet indicates that the packet data (Sequence number, Flow ID, Flow version) was signed with a flow private key matching the private key in the flow entry in the database.

21. The non-transitory computer readable medium of claim 20 wherein e) comprises ignoring the packet if the packet data was not signed with a flow private key matching the private key in the flow entry.

22. The non-transitory computer readable medium of claim 20 wherein e) further comprises testing the packet sequence number against a replay protection buffer for packets received from a next node, if the packet data was signed with a flow private key matching the private key in the flow entry in the database and if the packet has already been received, or is old, ignoring the packet.

23. The non-transitory computer readable medium of claim 22 wherein e) further comprises forwarding the packet without modification to the previous node and/or next node, if the packet data was signed with a flow private key matching the private key in the flow entry in the database and the packet has not already been received and the packet is not old.

24. The non-transitory computer readable medium of claim 23 further comprising updating the timestamp in the flow entry of the last packet received to the current timestamp.

25. The non-transitory computer readable medium of claim 23 wherein the packet is received from the previous node and the system forwards the packet, without modification, to the next node.

26. The non-transitory computer readable medium of claim 23 wherein the packet is received from the next node and the system forwards the packet, without modification, to the previous node.

27. The non-transitory computer readable medium of claim 23 further comprising f) removing the flow entry from the database if packets with the Flow ID corresponding to the flow entry have not been received for a predetermined period of time from the previous node and/or the next node and ceasing to forward packets for with the Flow ID corresponding to the removed flow entry.

28. The non-transitory computer readable medium of claim 18 wherein the database is also indexed to a Flow Version.

29. The non-transitory computer readable medium of claim 18 wherein the packet includes a Flow Version.

30. The non-transitory computer readable medium of claim 29 wherein performing the look up in the database includes looking using a Flow Version in the packet.

31. The non-transitory computer readable medium of claim 18 wherein a) further comprises receiving the description of the flow entry from a master server.

32. The non-transitory computer readable medium of claim 18, wherein a) comprises receiving a description of the flow entry in a packet from another node containing one or more flow tokens, each flow token including the flow ID, a flow version, address and port information for one or more other nodes in the flow, and a flow private key.

33. The non-transitory computer readable medium of claim 32, wherein the packet from the another node includes a previous node internet protocol (IP) address and port, a next node IP address and port.

34. The non-transitory computer readable medium of claim 32, wherein the node relay communication method further comprises attempting to decrypt a first flow token in the packet from the another node using a node private key and a master server public key; and
    modifying the packet by removing the first flow token and forwarding the resulting modified packet on to a next node IP address and port in the first flow token when the attempt to decrypt the first flow token succeeds.

35. A Master server system comprising:
    a processor;
    a memory;

wherein the Master server system is configured to implement the method for node relay communication comprising:
   a) receiving node information from nodes in a network;
   b) determining one or more flow routes between a beginning node and an end node from node information wherein each flow route of the one or more flow routes includes one or more nodes in the network other than the beginning node and the end node;
   c) sending flow route information to one or more nodes, wherein the flow route information includes one or more flow tokens corresponding to each node of one or more nodes in a flow route of the one or more flow routes, and a flow token for the server and wherein each flow token includes a flow identifier (ID), a flow version, a flow private key, an internet protocol (IP) address and a port for a next node and/or an IP address and a port for a previous node.

36. A Matchmaker server system comprising:
a processor;
a memory wherein the Matchmaking server system is configured to implement the method for node relay communication comprising;
   a) receiving a request from a client to connect to one or more servers;
   b) requesting one or more flow routes between the client and one or more servers from a master server;
   c) receiving flow route information for one or more flow routes between the client and the one or more servers from the master server, wherein the flow route information for a given flow route of the one or more flow routes includes a flow token for the client, one or more flow tokens corresponding to each relay of one or more relays in the given flow route, and a flow token for the server and wherein each flow token includes a flow ID, a flow version, a flow private key, an internet protocol (IP) address and port for a previous node and/or an IP address and port for a next.

* * * * *